United States Patent [19]

Wakamatsu

[11] Patent Number: 5,780,773
[45] Date of Patent: Jul. 14, 1998

[54] CABLE SUPPORTING MEMBER

[76] Inventor: Toshio Wakamatsu, 2-598-1-203 Kushibikicyou, Oomiya-shi Saitama-ken, Japan

[21] Appl. No.: 814,229

[22] Filed: Mar. 11, 1997

[51] Int. Cl.$^6$ ............................. H01B 7/08; H02G 9/04
[52] U.S. Cl. ..................... 174/72 C; 174/95; 174/98
[58] Field of Search ..................... 174/70 R, 72 C, 174/72 R, 95, 96, 97, 98, 117 F, 100, 101

[56] References Cited

U.S. PATENT DOCUMENTS

| | | | |
|---|---|---|---|
| 737,997 | 9/1903 | Burk | 179/97 |
| 2,391,409 | 12/1945 | Geist et al. | 174/72 C |
| 3,029,303 | 4/1962 | Severmo | 174/70 C |
| 4,404,425 | 9/1983 | Rich | 174/97 |
| 4,801,764 | 1/1989 | Ohlhaber | 174/70 C |
| 5,095,822 | 3/1992 | Martin | 174/97 |
| 5,120,903 | 6/1992 | Tam | 174/35 GC |
| 5,184,793 | 2/1993 | Heidt | 248/56 |
| 5,399,813 | 3/1995 | McNeill et al. | 174/117 F |
| 5,442,136 | 8/1995 | Allen | 174/95 |
| 5,529,829 | 6/1996 | Koshenmaki et al. | 174/117 F |

*Primary Examiner*—Kristine L. Kincaid
*Assistant Examiner*—Dhiru R. Patel

*Attorney, Agent, or Firm*—Wenderoth, Lind & Ponack, L.L.P.

[57] ABSTRACT

A cable supporting member includes a supporting section 11 having grooves 9a and 9b formed therein for receiving cables 5, and a pair of side sections 13a and 13b formed integrally with the supporting section 11. Each side section has an upper surface inclined in such a manner that its thickness gradually decreases with the distance from the supporting section 11 toward its outer edge. Installation of cables can be easily performed by fitting ordinary communication cables or the like in the grooves and laying flexible floor covering elements on the cable supporting member fitted with the cables. Since core wires need not be embedded in the cable supporting member, it is unnecessary to connect the cable on the cable supporting member to communication cables etc. Also, after installation, the outside appearance of the floor is not spoiled by the cable supporting member. Further, the cables fitted in the grooves are protected by the supporting section, and therefore, even when a load is applied to the cable supporting member, it does not directly act on the cables, so that the cables are scarcely damaged. Since no core wires are included, the cable supporting member is simple in structure and can be continuously produced with ease, whereby the manufacturing process is simplified and the cost can be reduced.

6 Claims, 7 Drawing Sheets

F I G. 10
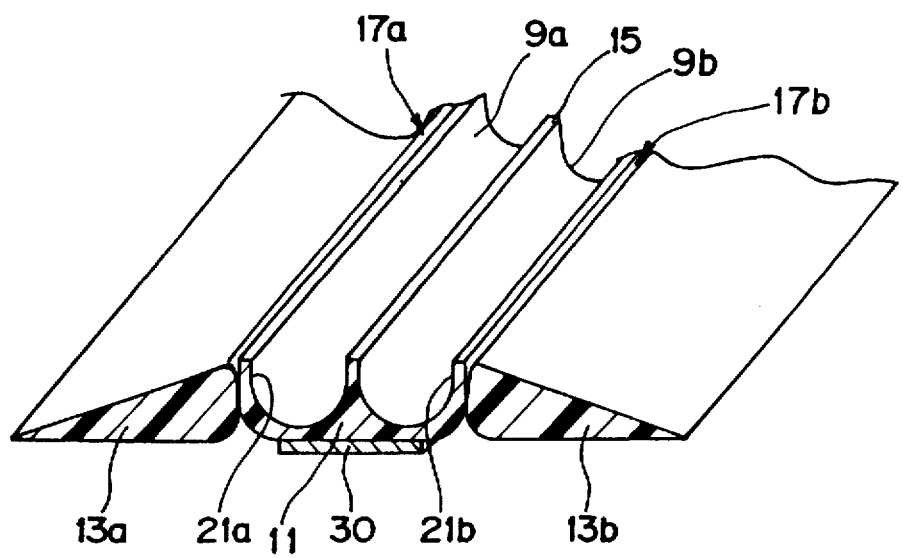
F I G. 11
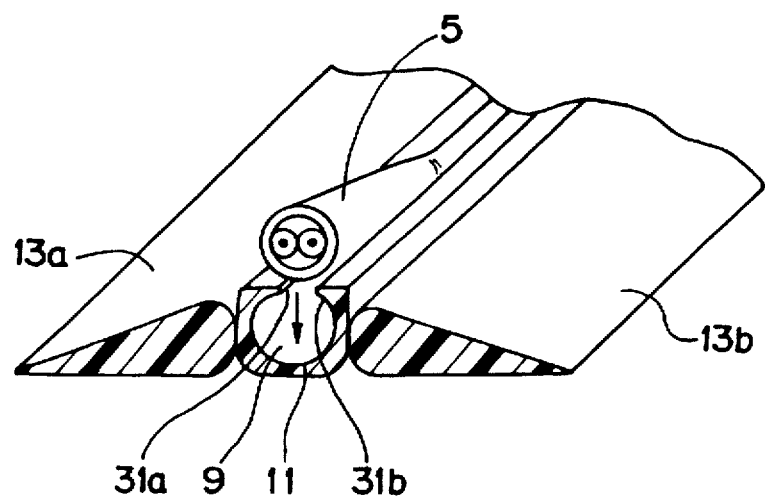

CABLE SUPPORTING MEMBER

BACKGROUND OF THE INVENTION

1. Field of the Invention

The present invention relates to a cable supporting member for supporting cables to be laid on flooring, such as communication cables of OA (Office Automation) equipment, computer or electric power cables, and more particularly, to a cable supporting member for supporting cables to be laid on flooring which is specially designed to facilitate OA and is covered with flexible floor covering elements.

2. Description of the Related Art

In general, OA equipment installed in a building, such as computers, printers and facsimile machines, need to be connected to communication cables extended from the same or other floors.

Especially in cases where numerous computers etc. are arranged on a floor, a large number of communication cables must be connected, thus making the wiring on the floor complicated.

Also in the case of non-OA flooring, cables extended from connectors or the like which are usually provided in the wall must be laid on the floor to be connected to individual apparatus. Therefore, in order to protect the cables as well as to improve the outside appearance, the floor is often covered with flexible covering elements.

As a means of laying cables under the flexible floor covering elements, a round cable is laid under the floor covering elements and thus protrudes therefrom. Therefore, the outside appearance of the floor is spoiled because the floor (covering elements) locally rises, and a person may feel strange when walking on the floor. In addition, a problem arises in that when an object is placed on the cable supporting member, the cable directly receives the weight of the object and may possibly be damaged.

Also conventionally known is a flat-shaped cable supporting member, or a flat cable 55, of which the height gradually decreases toward each side edge, as shown in FIG. 13. Since this flat cable 55 as the cable supporting member is flat as a whole, the floor covering elements rise less when placed on the flat cable and a person will feel less strange when walking on the floor.

In this flat cable 55, however, core wires 57 are formed integrally with the supporting member, and thus ordinary round cables etc. cannot be used directly with this supporting member.

To use the flat cable, therefore, after an ordinary cable is pulled out of a wiring outlet, its wires must be connected to the respective core wires 57 of the flat cable. Connecting the wires one by one, however, consumes much labor, because each communication cable generally includes multiple wires, for example, eight or four wires.

Further, in cases where cables (or core wires) must be connected at numerous locations, the reliability (performance) of the cables is reduced and, in some cases, wires maybe erroneously connected.

Since the core wires 57 are formed integrally with the flat cable 55, moreover, the manufacturing process is complicated and the cost is high.

SUMMARY OF THE INVENTION

An object of the present invention is to provide a cable supporting member which permits direct use of ordinary communication cables etc. and which is high in reliability but inexpensive.

According to an aspect of the present invention, there is provided a cable supporting member for supporting a cable to be laid on a floor. The cable support member includes a supporting section having a groove formed therein for receiving the cable and a pair of side sections formed integrally with the supporting section. Each of the side sections has an upper surface inclined in such a manner that a thickness thereof gradually decreases with the distance from the supporting section toward an outer edge thereof.

According to the present invention, installation of cables can be easily performed by fitting an ordinary communication cable or the like in the groove formed in the cable supporting member placed on a floor and laying flexible floor covering elements on the cable supporting member fitted with the cable. It is, therefore, unnecessary to connect the cable on the cable supporting member to a communication cable etc.

The cable supporting member is formed such that the thickness of each of the side sections on opposite sides of the supporting section gradually decreases, and thus the protrusion of the cable is less prominent, so that the outside appearance of the floor is not spoiled and a person does not feel strange when stepping on the cable supporting member. Further, the cable fitted in the groove is protected by the supporting section, and therefore, even when a person steps on the cable supporting member or a heavy object is placed on the cable supporting member, the load is borne by the supporting section and does not directly act on the cable, so that the communication cable is scarcely damaged.

Further, since the cable supporting member is made up only of the supporting section and the side sections, the structure is simple and it is possible to continuously produce the cable supporting member with ease by one-piece molding, whereby the manufacturing process is simplified and the cost can be reduced.

The groove in the supporting section has a circular arc cross section so as to receive a round cable having a substantially circular cross section.

Since the groove formed in the supporting section has a circular arc cross section, ordinary cables having a nearly circular cross section can be directly used.

A cut is formed at a location between the supporting section and each side section and extends in the lengthwise direction of the cable supporting member, and each side section is separable from the supporting section along the cut.

Since the cut is formed at a location between the supporting section and each side section, either of the side sections can be easily manually torn off along the cut. Therefore, the side section may be removed as needed on the site of installation, so that the supporting sections of two cable supporting members, for example, may be placed side by side for use.

Further, a plurality of V-shaped cuts are formed in the outer portion of each side edge section, to facilitate bending of the cable supporting member.

The V-shaped cuts permit the entire cable supporting member to be bent more freely, that is, the cable supporting member itself can be easily bent in the width direction, whereby the efficiency of wiring work is improved.

Further, a plurality of grooves are formed in a side by side relation in the supporting section.

Further, a plurality of cables can be fitted in the respective grooves formed in the single supporting section, whereby the operation efficiency is improved.

The supporting section has three grooves formed therein for receiving two electric power cables and one grounding cable. respectively.

The cable supporting member can be used for the wiring of ordinary electric power cables. Since electric power cables can be laid on flooring. the wiring is facilitated. Also in this arrangement, when the cable supporting member is stepped on or a heavy object is placed on the cable supporting member. the load is prevented from being directly applied to the electric power cables and thus they are scarcely damaged.

The supporting section has two grooves formed therein for receiving two communication cables. respectively.

Communication cables of computers. facsimile machines. etc. can be laid on flooring. and thus the wiring is facilitated. Particularly, even in the case where computers, facsimile machines. etc. for communication purposes are additionally installed as needed on different occasions. the required wiring can be easily performed.

The supporting section has an adhesive tape affixed to a bottom surface thereof.

Since the adhesive tape is provided. the cable supporting member is prevented from being displaced or shifted after the installation. and it is also possible to prevent the cables supported by the cable supporting member from being applied with a pulling force etc.

BRIEF DESCRIPTION OF THE DRAWINGS

FIG. 10 is a perspective sectional view of a further modification of the cable supporting member;

FIG. 11 is a perspective sectional view showing another modification of the cable supporting member;

DESCRIPTION OF THE PREFERRED EMBODIMENTS

An embodiment of the present invention will be hereinafter described in detail with reference to the accompanying drawings.

FIGS. 1 through 6 illustrate a first embodiment of the present invention.

Figure 5:
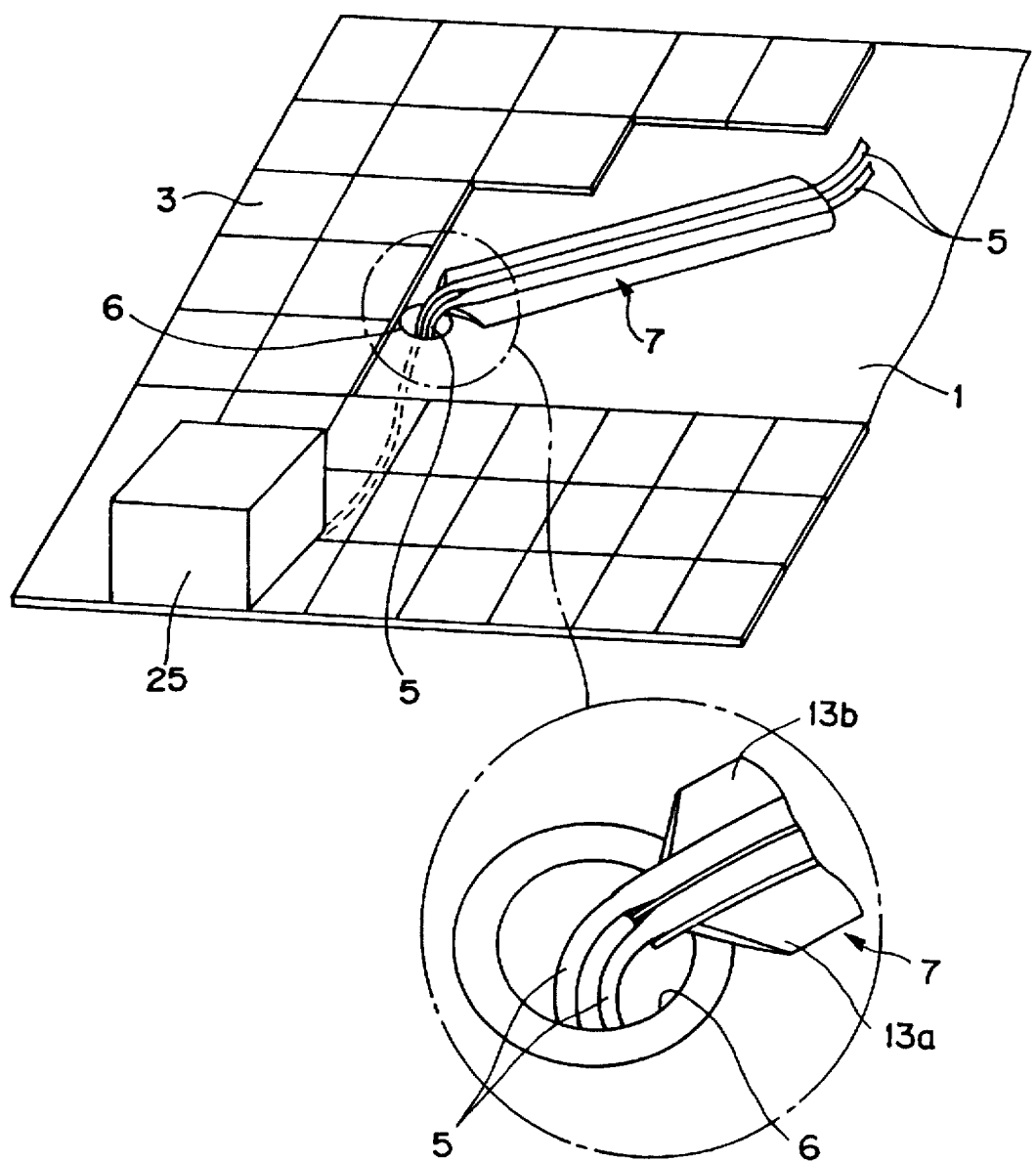
FIG. 5 is a perspective view illustrating how the cable supporting member of this embodiment is used on a floor.
Figure 6:
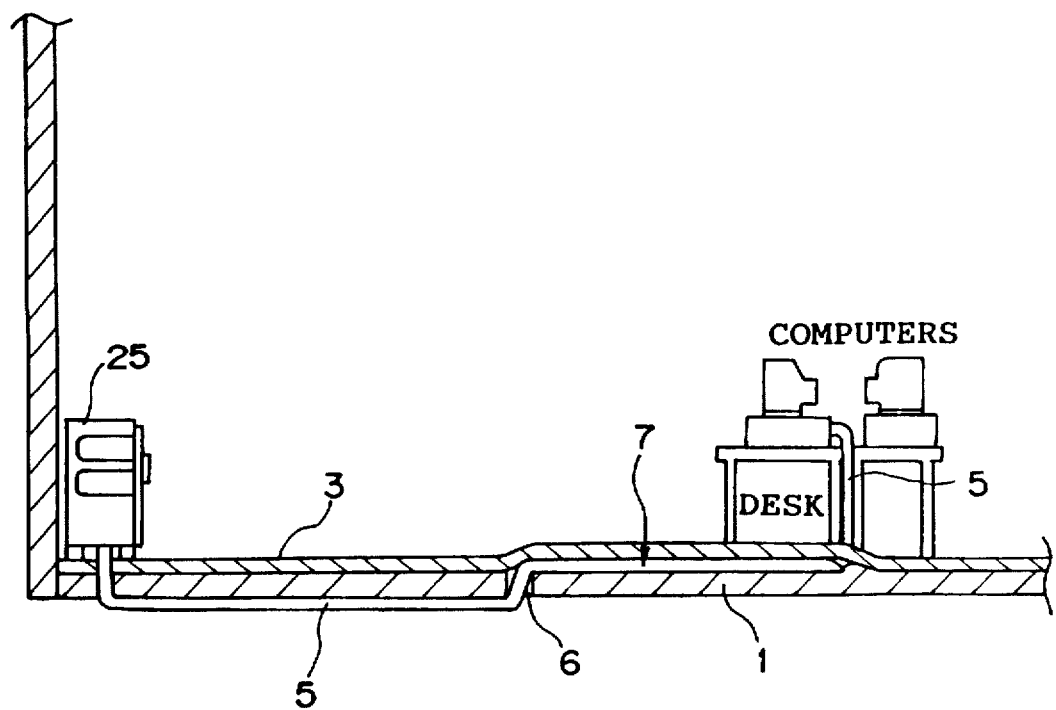
FIG. 6 is a sectional view of the floor shown in FIG. 5.

As shown in FIGS. 5 and 6, a cable supporting member 7 of this embodiment is placed on a floor 1, and flexible floor covering elements 3 are laid on the floor 1 so as to cover cables 5 arranged on the floor. By thus laying the floor covering elements 3, the cables 5 on the floor can be protected and also the outside appearance of the floor is improved.

Figure 2:
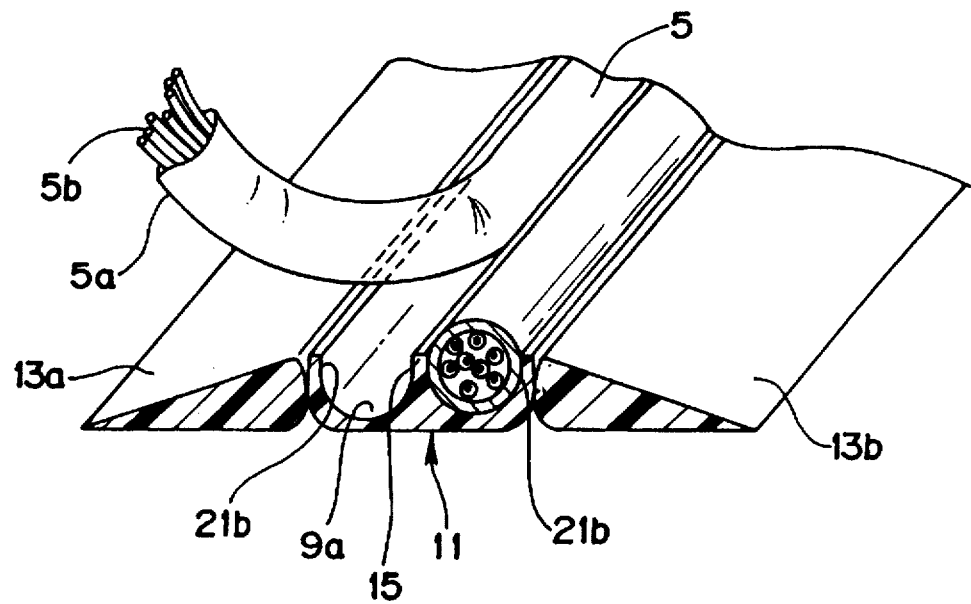
FIG. 2 is a perspective view showing how the cable supporting member of FIG. 1 is used.

The cables 5 used in this embodiment may be existing cables ordinarily used, for example. UTP (Unshielded Twisted-Pair) cables. As shown in FIG. 2, the UTP cable is an eight- or four-wire cable for use with computers (FIG. 2 illustrates eight-wire cables), and eight (or four) wires 5b are surrounded by a jacket 5a. The cables 5 to be used are not limited to UTP cables and may be telephone cables. power cables. etc.

Figure 1:
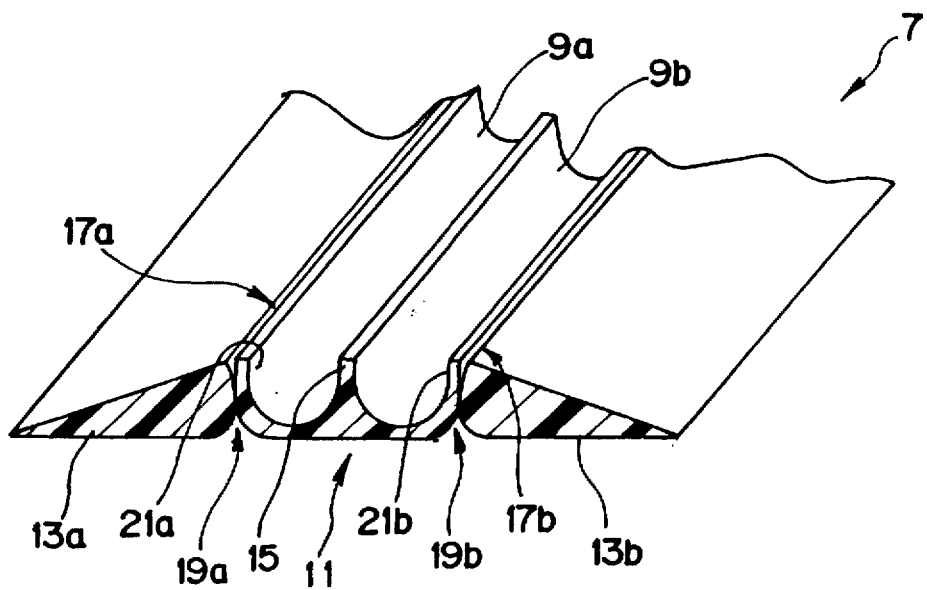
FIG. 1 is a perspective sectional view of a cable supporting member according to one embodiment of the present invention.

As shown in the perspective sectional view of FIG. 1, the cable supporting member 7 comprises a supporting section 11 having a pair of grooves 9a and 9b formed therein for receiving the cables 5 (see FIG. 2), and a pair of side sections 13a and 13b located on opposite sides of the supporting section 11, respectively.

The supporting section 11 is formed by making two grooves 9a and 9b, each having a semicircular cross section, side by side in the upper surface of the supporting section having a generally rectangular cross section. The grooves 9a and 9b are separated from each other by a partition wall 15.

The side sections 13a and 13b are formed integrally with the supporting section 11 on opposite sides thereof, and the upper surface of each side section 13a, 13b is inclined such that the thickness of the side section gradually decreases with distance from its base or inner longitudinal side surface close to the supporting section 11 to its outer longitudinal edge portion. Thus, the side sections 13a and 13b have a large total width relative to the supporting section 11, whereby the outside appearance of the floor is improved and a load acting on the supporting section can be distributed.

Longitudinal cuts 17a and 19a are formed in the lengthwise direction of the cable supporting member 7 at locations between the supporting section 11 and the side section 13a. Specifically, the cut 17a is formed in the upper surface of the cable supporting member in which the grooves 9a and 9b are also formed, while the cut 19a, which corresponds in position to the upside cut 17a, is formed in the lower or bottom surface of the cable supporting member facing the floor.

Since the cuts 17a and 19a are formed in the upper and bottom surfaces of the cable supporting member, respectively, the thickness is reduced at these cuts, making it possible to easily tear off the side section 13a from the supporting section 11 by hand. Also, the cuts 17a and 19a thus formed permit a supporting ridge 21a to move more freely, whereby the cable 5 can be easily press-fitted in the groove and the cable holding capacity increases due to the restoring force of the resilient supporting ridge. Similar cuts 17b and 19b are formed at locations between the supporting section 11 and the other side section 13b. These cuts provide advantages similar to those achieved by the cuts situated between the supporting section and the side section 13a, and therefore, detailed description thereof is omitted.

Figure 3:
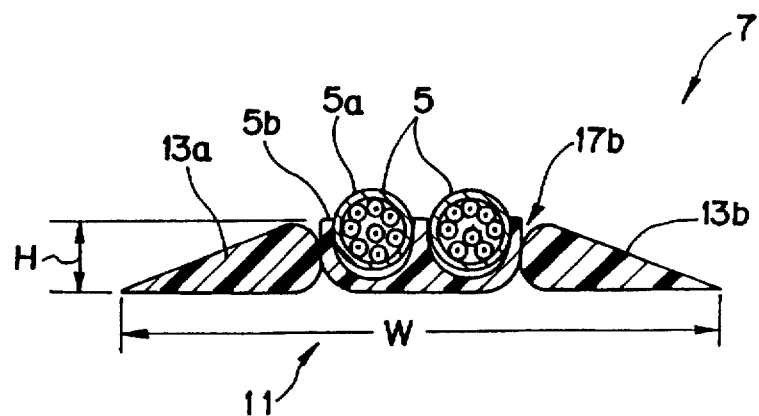
FIG. 3 is a sectional view showing a state in which cables are fitted in the cable supporting member shown in FIG. 1.

As shown in FIG. 3, the supporting ridges 21a and 21b and the partition wall 15 of the supporting section 11 determine the height H of the cable supporting member, and receive a load applied to the cable supporting member in the direction of the height H. Besides the supporting section 11, thick parts of the side sections 13a and 13b also receive a load, and since the load applied is distributed to the supporting section 11 and the side sections 13a and 13b, a relatively large load can be borne thereby.

The cable supporting member of this embodiment preferably has the following dimensions. The height H of the supporting section 11 is substantially equal to the thickness of the base of each side section 13a, 13b and is preferably set to 4 to 5 mm, in this embodiment, to about 5 mm, in consideration of the outside appearance of the floor. The dimensions of the grooves 9a and 9b are set corresponding to the dimensions of communication cables generally used, and the depth of each groove is preferably set to 4 to 5 mm, in this embodiment, to about 4 mm. The width w of the cable supporting member is preferably set to about 40 to 60 mm, in this embodiment, to about 46 mm, in view of the outside appearance of the floor.

Since there is space between the wires 5b of the cable 5 and thus the jacket 5a is deformable, the depth of each groove 9a, 9b need not be greater than the diameter of the cable 5. In the case where the outside diameter of the jacket of the cable is about 6 mm, a groove depth of about 5 mm suffices.

Figure 13:
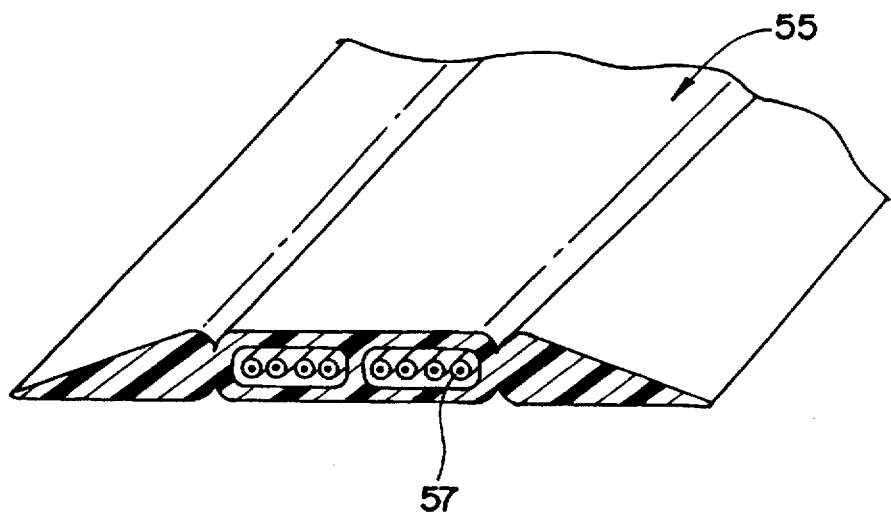
FIG. 13 is a perspective sectional view showing a conventional cable supporting member.

The supporting section 11 and the side sections 13a and 13b do not include core wires embedded therein, unlike the conventional flat cable (see FIG. 13), and can be easily produced by subjecting a plastic material having elasticity, such as vinyl chloride resin, to extrusion molding alone to obtain a one-piece member.

The material of the cable supporting member 7 is not particularly limited, but an elastic material is preferred in order to prevent a person from feeling strange when stepping on the cable supporting member as well as to facilitate handling.

The following explains how the cable supporting member of this embodiment is used.

Figure 4:
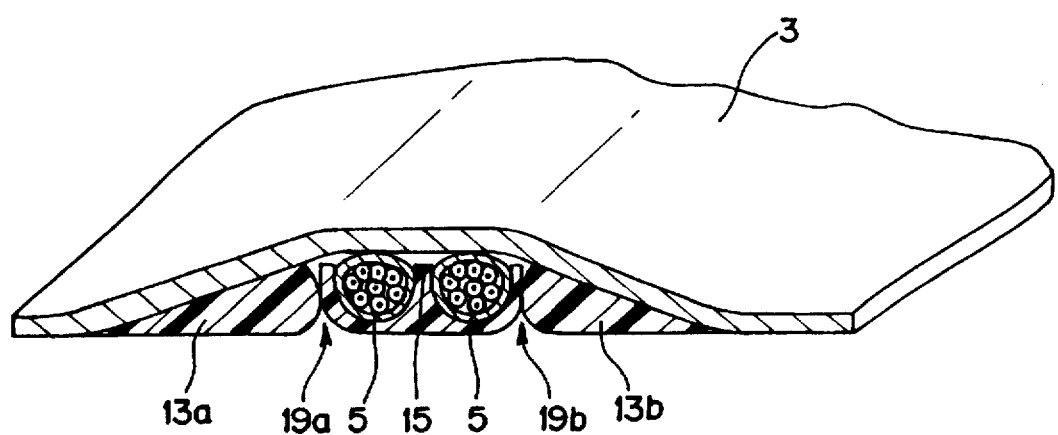
FIG. 4 is a perspective sectional view showing a state in which the cable supporting member of FIG. 3 is covered with a flexible floor covering element.

Ordinary cables 5 extended through a lead-in opening 6 formed in a floor from a line concentrator 25 arranged on the same floor, as shown in FIGS. 5 and 6, are directly press-fitted in the respective grooves 9a and 9b of the cable supporting member 7 placed on the floor, as shown in FIG. 2. While in this state, the cables 5 slightly rise above the cable supporting member 7 as shown in FIG. 3, but when the flexible floor covering element 3 is laid on the cable supporting member, the jackets 5a of the cables are deformed due to the weight of the floor covering element, so that the heights of the cables become substantially on a level with the height H of the cable supporting member, as shown in FIG. 4.

Accordingly, the cables do not protrude beyond the height H of the cable supporting member 7. Therefore, when the cable supporting member is covered with the flexible floor covering elements 3, the floor scarcely gives a strange feeling and the outside appearance of the floor is not spoiled.

When a person steps on the cable supporting member or a heavy object is placed on the cable supporting member, a large load acts on the cable supporting member, but since this load is borne by the supporting section 11 and the side sections 13a and 13b, the load does not directly act on the cables 5, thereby preventing damage to the cables 5.

The cable supporting member of this embodiment does not require core wire connections and existing cables can be directly used, whereby the operation efficiency is improved. Also, the cable installation time can be remarkably shortened, compared with the case of using the conventional cable supporting member, and lowering of the cable performance due to additional connections of core wires and erroneous connection do not occur, thus preventing deterioration in the function of cables.

Figure 7:
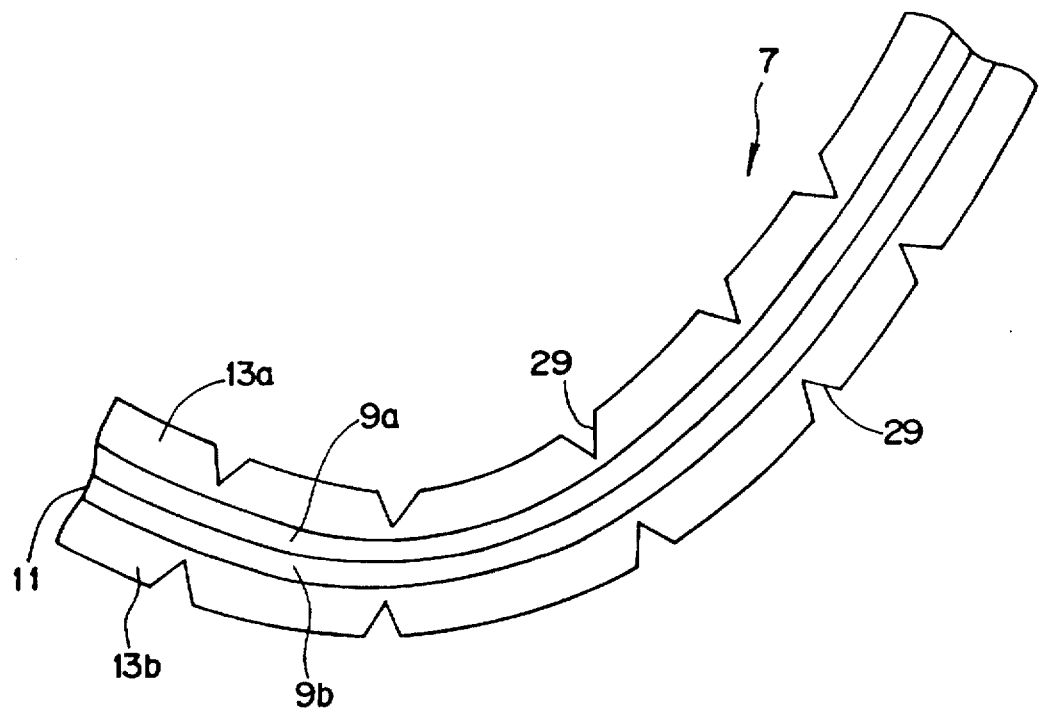
FIG. 7 is a plan view showing a modification of the cable supporting member.

In the case where the cables 5 from the lead-in opening 6 are to be curved, instead of being extended straight, on the floor, a plurality of V-shaped cuts 29 maybe formed in the outer portion of each side section, as shown in FIG. 7. In this case, the cable supporting member has increased degree of freedom, that is, the cable supporting member itself can be easily bent in the width direction, and accordingly, wiring can be performed with improved efficiency in accordance with the required connection spots. The interval between adjacent cuts 29 is not particularly limited, and in this embodiment, the cuts 29 are formed at intervals of about 40 mm. In order to keep the cable supporting member 7 curved, an adhesive tape may be used as needed to attach the cable supporting member to the floor.

Figure 8:
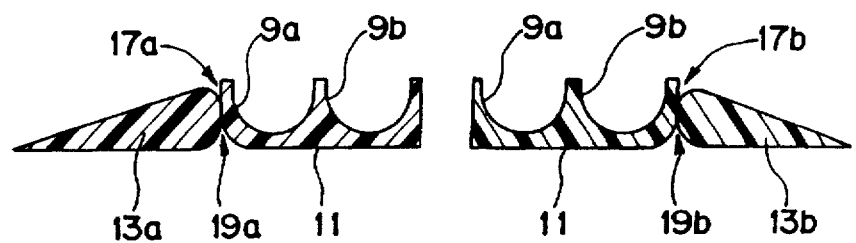
FIG. 8 is a sectional view showing how another modification of the cable supporting member is used.

The cables 5 to be laid may be four or six and not two. In such cases, the side section 13a (or 13b) held with one hand of the operator may be torn off from the supporting section 11 along the longitudinal cuts 17a and 19a (or 17b and 19b). Two cable supporting members from which one side section (13a, 13b) has been removed in this manner are placed side by side, as shown in FIG. 8, whereby the supporting sections have a total of four grooves and thus can receive four cables 5 collectively.

The present invention is not limited to the embodiment described above and various modifications can be made without departing from the gist of the present invention.

Figure 9:
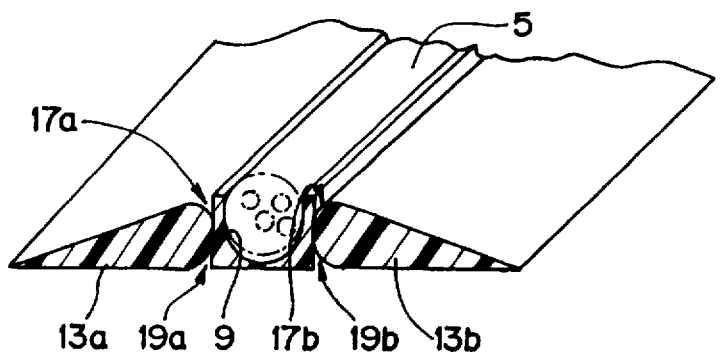
FIG. 9 is a perspective sectional view showing still another modification of the cable supporting member.

For example, as shown in FIG. 9, a single groove 9 may be formed in the supporting section 11 for receiving a single cable 5, and also in this case similar advantages can be achieved. This cable supporting member can be used to support not only cables for computers but also telephone cables, communication cables, and electrical connection cables.

Also, adhesive may be applied to or an adhesive double coated tape 30 may be affixed to the bottom surface of the supporting section 11 or the side sections 13a and 13b, as shown in FIG. 10, and in this case displacement of the cable supporting member can be prevented.

Instead of the adhesive double coated tape, an adhesive tape having adhesive coated on one side only may be affixed from above the cable supporting member 7 so as to fix the cable supporting member to the floor, whereby displacement of the cable supporting member is prevented.

Further, as shown in FIG. 11, inwardly protruding ridges 31a and 31b may be formed on the upper surface of the supporting section above the groove 9 so that the opening of the groove 9 may be narrowed. In this case, advantages similar to those described above can be achieved, and moreover, once the cable 5 is press-fitted in the groove 9, it can be securely held in position.

Figure 12:
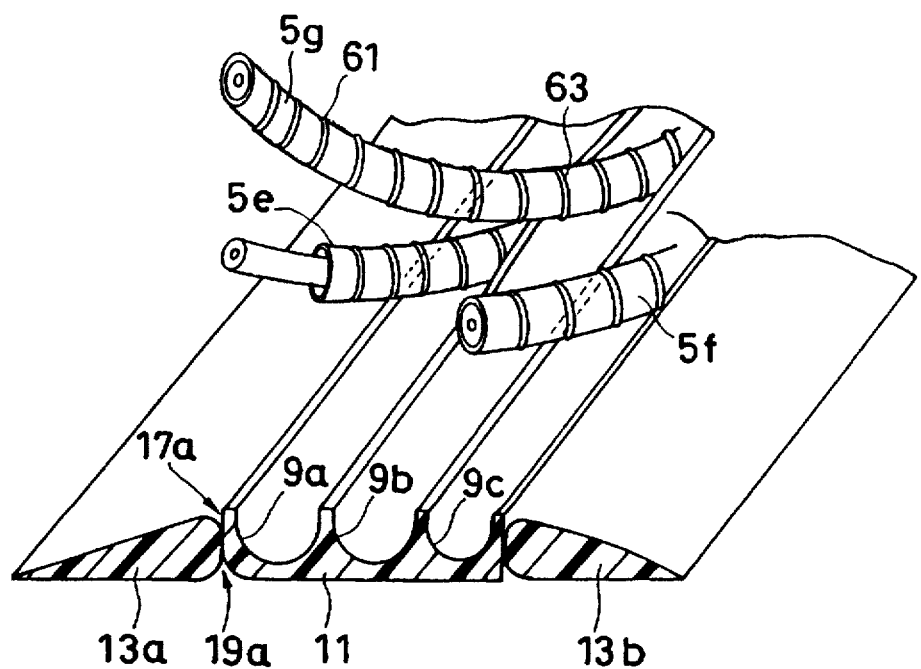
FIG. 12 is a perspective sectional view showing a still another modification of the cable supporting member.

FIG. 12 illustrates the case where the cable supporting member is used to support electric power cables. In the illustrated example, three grooves 9a, 9b and 9c are formed in the supporting section 11 of the cable supporting member 7, for supporting a total of three cables. Specifically, two electric power cables 5e and 5f are fitted in the grooves 9a and 9c on opposite sides, respectively, and a grounding cable 5g is fitted in the center groove 9b. A steel wire 61 is helically wound around the jacket of each of the cables 5e, 5f and 5g to form a helical ridge 63 thereon, so that each cable may have flexibility.

What is claimed is:

1. A cable supporting member comprising:

a supporting section defining a groove formed in an upper surface thereof, said groove having a cross section which is arc-shaped such that a round cable having a substantially circular cross section can be received therein; and a pair of side sections formed integrally with said supporting section, each of said side sections having an outer longitudinal edge portion, an inner longitudinal side surface which is connected to said supporting section, and an upper surface which is inclined upwardly from said outer longitudinal edge portion toward said inner longitudinal side surface such that a thickness of each of said side sections gradually decreases in a direction away from said supporting section, wherein said supporting section and said pair of side sections are formed of elastic material, and a first cut is formed between said supporting section and one of said side sections and a second cut is formed between said supporting section and the other of said side sections such that each side section is separable from said supporting section.

2. The cable supporting member as claimed in claim 1, wherein each of said side sections includes a plurality of V-shaped cuts formed in said outer longitudinal edge portion.

3. The cable supporting member as claimed in claim 1, wherein said upper surface of said supporting section defines a plurality of grooves which are disposed in a side-by-side relation.

4. The cable supporting member as claimed in claim 3, wherein said plurality of grooves in said supporting section comprise three grooves for receiving two electric power cables and one grounding cable, respectively.

5. The cable supporting member as claimed in claim 3, wherein said plurality of grooves comprise two grooves for receiving two communication cables, respectively.

6. The cable supporting member as claimed in claim 1, further comprising an adhesive tape affixed to a bottom surface of said supporting section.

* * * * *

UNITED STATES PATENT AND TRADEMARK OFFICE
CERTIFICATE OF CORRECTION

PATENT NO. : 5,780,773
DATED : July 14, 1998
INVENTOR(S) : Toshio WAKAMATSU

It is certified that error appears in the above-identified patent and that said Letters Patent is hereby corrected as shown below:

On the title page, the following has been inserted:

--[30]   Foreign Application Priority Data

March 12, 1996   [JP] Japan   ......8-083185--

Signed and Sealed this

Nineteenth Day of October, 1999

Attest:

Attesting Officer

Q. TODD DICKINSON

Acting Commissioner of Patents and Trademarks